US009334947B2

(12) United States Patent
Varghese et al.

(10) Patent No.: US 9,334,947 B2
(45) Date of Patent: May 10, 2016

(54) DEVICE FOR SEQUENTIAL CLEANING LUBRICATING A DRIVE CHAIN, IN PARTICULAR OF A MOTORCYCLE

(75) Inventors: Aby Varghese, Bangalore (IN); Gopakumar Parameswaran, Bangalore (IN)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 53 days.

(21) Appl. No.: 14/241,899

(22) PCT Filed: Aug. 28, 2012

(86) PCT No.: PCT/US2012/052588
§ 371 (c)(1),
(2), (4) Date: Feb. 28, 2014

(87) PCT Pub. No.: WO2013/033050
PCT Pub. Date: Mar. 7, 2013

(65) Prior Publication Data
US 2014/0213399 A1 Jul. 31, 2014

(30) Foreign Application Priority Data
Aug. 29, 2011 (IN) ............................ 2970/CHE/2011

(51) Int. Cl.
*F16H 57/00* (2012.01)
*F16H 57/04* (2010.01)
(Continued)

(52) U.S. Cl.
CPC ................. *F16H 57/05* (2013.01); *B62J 31/00* (2013.01); *B62J 2300/0066* (2013.01)

(58) Field of Classification Search
CPC .... B62J 311/00; F16N 2210/33; F16H 57/05; B27B 17/08; B65G 45/16

USPC ........................................................ 474/91, 92
See application file for complete search history.

(56) References Cited

U.S. PATENT DOCUMENTS 545,972 A * 9/1895 Polleys ............................ 474/92
556,733 A * 3/1896 Byrne ......................... 192/217.1
(Continued)

FOREIGN PATENT DOCUMENTS

| CN | 2326506 | 6/1999 |
|---|---|---|
| CN | 2014-15732 | 3/2010 |

(Continued)

OTHER PUBLICATIONS

International search report for PCT International Application No. PCT/US2012/052588, mailed on Nov. 13, 2012, 3pgs.

*Primary Examiner* — Henry Liu
(74) *Attorney, Agent, or Firm* — Aleksander Medved

(57) ABSTRACT

The present invention relates to a device (100) for sequential cleaning and lubricating a drive chain (200) of a motorcycle, which comprises a housing (10) having top and bottom casings (12, 14) connected together in such a way that the housing is partitioned into a plurality of compartments (30, 40, 50) into which the chain is enclosed. Nozzles (70) are arranged within each compartment of the housing and placed radially inwards onto the chain to supply medium onto the chain. Brushes (60) are attached in the interior of at least one of the compartments of the housing in such a way that bristles (60*a*) of the brushes are positioned towards and in contact with the chain. At least one drain trap region (14*a*) is formed inside the bottom casing of each compartment of the housing to collect and drain the residue of medium. Such device achieves reliable and efficient cleaning and lubrication of the drive chain by rapid transferring of cleaning and lubricating material from multiple directions.

11 Claims, 6 Drawing Sheets

(51) Int. Cl.
- *F16N 7/16* (2006.01)
- *F16N 7/24* (2006.01)
- *F16N 13/22* (2006.01)
- *F16H 57/05* (2006.01)
- *B62J 31/00* (2006.01)

(56) References Cited

U.S. PATENT DOCUMENTS

| | | | | |
|---|---|---|---|---|
| 577,503 | A * | 2/1897 | Ash | 474/92 |
| 602,000 | A * | 4/1898 | Fay | 474/92 |
| 603,654 | A * | 5/1898 | Norris | 144/242.1 |
| 604,429 | A * | 5/1898 | Sise | 474/92 |
| 607,014 | A * | 7/1898 | Bostwick | 172/292 |
| 608,609 | A * | 8/1898 | Kinnard | 474/92 |
| 616,593 | A * | 12/1898 | Stanbury, Jr. | 15/160 |
| 617,224 | A * | 1/1899 | Conn | 15/88.3 |
| 628,087 | A * | 7/1899 | Gibford | 474/92 |
| 635,778 | A * | 10/1899 | Hudelson | 474/92 |
| 648,724 | A * | 5/1900 | Cole | 474/92 |
| 648,866 | A * | 5/1900 | Gibford | 474/92 |
| 3,931,991 | A * | 1/1976 | Marchello | 280/295 |
| 4,009,764 | A * | 3/1977 | Hafner | 184/15.2 |
| 4,280,591 | A * | 7/1981 | Newcomb | 184/17 |
| 4,578,120 | A * | 3/1986 | Chiarella | 134/9 |
| 4,593,923 | A * | 6/1986 | Thalmann | 280/261 |
| 4,648,486 | A * | 3/1987 | Kayser et al. | 184/15.1 |
| 4,783,186 | A * | 11/1988 | Manning et al. | 401/190 |
| 4,827,555 | A * | 5/1989 | Fruit et al. | 15/160 |
| 4,891,037 | A * | 1/1990 | Maples | 474/91 |
| 4,955,850 | A * | 9/1990 | Lee | 474/92 |
| 5,020,637 | A * | 6/1991 | Hoenselaar et al. | 184/15.1 |
| 5,069,470 | A * | 12/1991 | Spencer | 280/288.4 |
| 5,070,569 | A * | 12/1991 | Wilkins | 15/160 |
| 5,213,180 | A * | 5/1993 | Masonek et al. | 184/15.2 |
| 5,360,084 | A * | 11/1994 | Graf | 184/3.2 |
| 5,443,139 | A * | 8/1995 | Scott | 184/15.2 |
| 5,484,038 | A * | 1/1996 | Rowell | 184/15.1 |
| 5,595,262 | A * | 1/1997 | Martin | 184/15.2 |
| 5,647,456 | A * | 7/1997 | Gelb | 184/15.2 |
| 5,711,050 | A * | 1/1998 | Pimentel | 15/302 |
| 5,888,310 | A * | 3/1999 | Steffey | 134/6 |
| 5,934,411 | A * | 8/1999 | Murano et al. | 184/11.5 |
| 6,257,369 | B1 * | 7/2001 | Pesl | 184/15.1 |
| 6,763,545 | B2 * | 7/2004 | Silvers et al. | 15/106 |
| 6,942,409 | B2 * | 9/2005 | Barbieri | 401/10 |
| 8,181,747 | B2 * | 5/2012 | Feldstein | 184/15.1 |
| 8,511,436 | B2 * | 8/2013 | Feldstein | 184/15.1 |
| 8,636,114 | B2 * | 1/2014 | Feldstein | 184/15.1 |
| 8,757,325 | B2 * | 6/2014 | Singer | 184/15.1 |
| 8,998,757 | B2 * | 4/2015 | Alley | 474/92 |
| 9,028,351 | B1 * | 5/2015 | Rodriguez | 474/91 |
| 9,079,720 | B1 * | 7/2015 | Schmidt | |
| 2005/0000752 | A1 * | 1/2005 | Fleige | 184/15.1 |
| 2007/0044267 | A1 * | 3/2007 | Connolly | 15/256.6 |
| 2009/0165229 | A1 * | 7/2009 | Yu | 15/106 |
| 2010/0101607 | A1 * | 4/2010 | Feldstein | 134/15 |
| 2012/0180821 | A1 * | 7/2012 | Feldstein | 134/30 |
| 2012/0204902 | A1 * | 8/2012 | Petersen | 134/6 |
| 2013/0274044 | A1 * | 10/2013 | Feldstein | 474/91 |

FOREIGN PATENT DOCUMENTS

| | | |
|---|---|---|
| DE | 3839076 | 6/1989 |
| GB | 2456010 | 7/2009 |
| TW | 529471 U | 4/2003 |

\* cited by examiner

DEVICE FOR SEQUENTIAL CLEANING LUBRICATING A DRIVE CHAIN, IN PARTICULAR OF A MOTORCYCLE

CROSS REFERENCE TO RELATED APPLICATIONS

This application is a national stage filing under 35 U.S.C. 371 of PCT/US2012/052588, filed Aug. 28, 2012, which claims priority to Indian Application No. 2970/CHE/2011 filed Aug. 29, 2011, the disclosures of which are incorporated by reference in their entireties herein.

FIELD OF THE INVENTION

The present invention relates to cleaning and lubricating chains, in particular of motorcycles more specifically present invention relates to a device for sequential cleaning and lubricating the drive chains of the motorcycles that rapidly and significantly transfers the cleaning and lubricating material from multiple directions on to the profile of the surface to be cleaned and lubricated without coming in contact with any surface.

BACKGROUND OF THE INVENTION

Sprocket drive chains are generally found on motorcycles and bicycles, and are comprised of a plurality of small individual links pivotally joined together to form a continuous loop attachable around at least two sprockets. The junctions of the chain links are particularly susceptible to binding and wear from friction, and therefore require sufficient lubrication. Further, these drive chains are generally exposed to dirt, oil, water and dust. Thus, the drive chains must be cleaned and lubricated frequently and accurately for optimum efficiency. Even small foreign bodies such as sand or the like which adhere to the links of the drive chain considerably reduce its service life. Thus, it is important for regular maintenance and periodic cleaning of the drive chains. Usually, cleaning is performed by means of solvents and lubrication is performed by means of lubricants, where still other cleaning means may be used depending on the situations.

The conventionally common process of drive chain cleaning, in particular for two wheelers, is a manual method done in two wheeler service stations, where service mechanic at the time of servicing the vehicle, removes the chain and cleans the chain manually with a brush and an aerosol cleaner and then fix it back into the two wheeler. The amount of time involved in the whole process is enormous and the dirt and oil spillage on other parts of the two wheelers like fuel tank, tiers, chain sprocket etc and the station floor during the process is again huge.

Further, the prior art document DE 38 39 076 A discloses a device for cleaning and drying chains for racing bicycles which includes a two-part housing through which the chain is guided. Wheels with bristles are arranged in the housing which, on the one hand, mechanically clean the chain and, on the other hand, deflect it into the lower region of the housing. A trough is formed in the lower region of the housing which can receive a cleaning medium. The chain is cleaned by the immersion in the cleaning medium. Depending on the tension of the chain, the deflection of the chain requires a relatively large force which must be absorbed by the device. Moreover, a further disadvantage of this known solution is that the dirt detaching from chain accumulates in the trough and can partly end up back on the chain again. Moreover, the inner side of the chain whose cleaning and lubrication is particularly critical is disadvantaged in this method. Further, there is no provision to make sure that the links of the chain are drained of solvent when they emerge from the solvent bath.

Various other drive chain cleaning and lubrication methods and devices have since been introduced which can be applied with the chain still on the vehicle sprockets. A disadvantage of many of the prior art approaches is that they are structured to provide effective and reliable cleaning and lubrication of the drive chain. With respect to the conventional cleaning approaches, it is a messy and time consuming operation, required the removal of the chain from the motorcycle or bicycle where it could be immersed in a cleaning and lubricating solvent or lubricating oil. Further, it is not convenient and feasible to adapt to any vehicles.

Therefore, it is desirable to provide a sophisticated cleaning and lubricating device which is fast in cleaning and lubricating the chain consuming very little time and effort, and facilitates a reliable and efficient cleaning and lubrication of the drive chains. It also has the flexibility to adapt to any two wheeler vehicles and remove any kind of stubborn dirt, oil and dust. The devise can be directly fitted unto the vehicle for cleaning and lubricating purpose without removing the chain from the vehicle and ensure zero spillage or overspray of oil and dirt either on the station floor or on the other parts of the vehicle. Further, the present invention is capable of overcoming the aforementioned drawbacks of the conventional approaches.

SUMMARY OF THE INVENTION

An object of the present invention is to provide a device for sequential cleaning and lubricating a drive chain, in particular of a motorcycle, which is capable of rapidly and significantly transferring cleaning and lubricating material from multiple directions onto the profile of the surface to be cleaned and lubricated without coming in contact with any surface.

Another object of the present invention is to provide a device for sequential cleaning and lubricating a drive chain, in particular of a motorcycle, which facilitates a reliable and efficient cleaning and lubrication of the drive chain with very little time and effort.

Another object of the present invention is to provide a device for sequential cleaning and lubricating a drive chain, in particular of a motorcycle, which is flexible, convenient and adaptable to any motorcycles, and also removes any kind of stubborn dirt, oil and dust from the chain surface and provides dust free lubrication to the chain.

Another object of the present invention is also to provide a device for sequential cleaning and lubricating a drive chain, in particular of a motorcycle, which facilitates dust & dirt free station area and other parts of the vehicles.

According to one aspect, the present invention, which achieves this objective, relates to a device for sequential cleaning and lubricating a drive chain, in particular of a motorcycle, comprising: a housing composed of a top casing and a bottom casing that are mutually connected together in such a way that the housing is partitioned into a plurality of compartments into which the drive chain is enclosed. A plurality of nozzles is arranged within each compartment of the housing and placed radially inwards onto the drive chain to supply medium onto the drive chain. A plurality of brushes is attached in the interior of at least one of the compartments of the housing in such a way that bristles of the brushes are positioned towards and in contact with the drive chain. At least one drain trap region is formed inside the bottom casing of each compartment of the housing to collect and drain the residue of medium during cleaning and lubricating the drive chain. Such arrangement of the device of the present invention is capable of rapidly and significantly transferring cleaning and lubricating material from multiple directions onto the drive chain to be cleaned and lubricated without coming in contact with any surface, in a reliable and efficient manner. Further, it is flexible, convenient and adaptable to any motorcycles, and also removes any kind of stubborn dirt, oil and dust from the chain surface and provides dust free lubrication to the chain.

Furthermore, the housing defines passageway openings in each compartment for allowing the drive chain to pass through each compartment of the housing when the top casing and the bottom casing are in closed condition. The top casing is hinged and snap-fitted on to the bottom casing so that the top and bottom casings are flipped apart each other for opening and closing of the housing. In each compartment, at least three of the nozzles are placed and directed in upper side and two opposing sides of the interior of the top casing of the housing to supply the medium from different directions. The plurality of compartments is composed of at least one solvent cleaning compartment, at least one pneumatic and contact cleaning compartment and at least one lubricant compartment. The solvent cleaning compartment, the pneumatic and contact cleaning compartment and the lubricant compartment are respectively located at front, center and rear of the housing with respect to the direction of movement of the drive chain.

In addition, the brushes are attached in both the top and bottom casings of the housing and positioned in front of the nozzles at the interior of the pneumatic and contact cleaning compartment and the lubricant compartment to wipe off the drive chain from different directions. Each nozzle is extended and connected with external connecting elements on which external tubes are inserted in order to supply the medium onto the drive chain through the nozzles. The medium is a solvent cleaning agent, a pneumatic cleaning agent or a lubricating agent. The solvent cleaning agent, the pneumatic cleaning agent and the lubricating agent are respectively fed onto the drive chain through the respective nozzles of each of the solvent cleaning compartment, the pneumatic and contact cleaning compartment and the lubricant compartment. The top and bottom casings of the housing are held onto a sprocket shaft of the motorcycle by at least one mounting bracket. Moreover, the device is fitted onto the sprocket shaft of the motorcycle to clean and lubricate the drive chain of the motorcycle by transferring the medium from multiple directions onto the surface of the drive chain.

BRIEF DESCRIPTION OF THE ACCOMPANYING DRAWINGS

BRIEF DESCRIPTION OF THE ACCOMPANYING EMBODIMENTS

Figure 1:
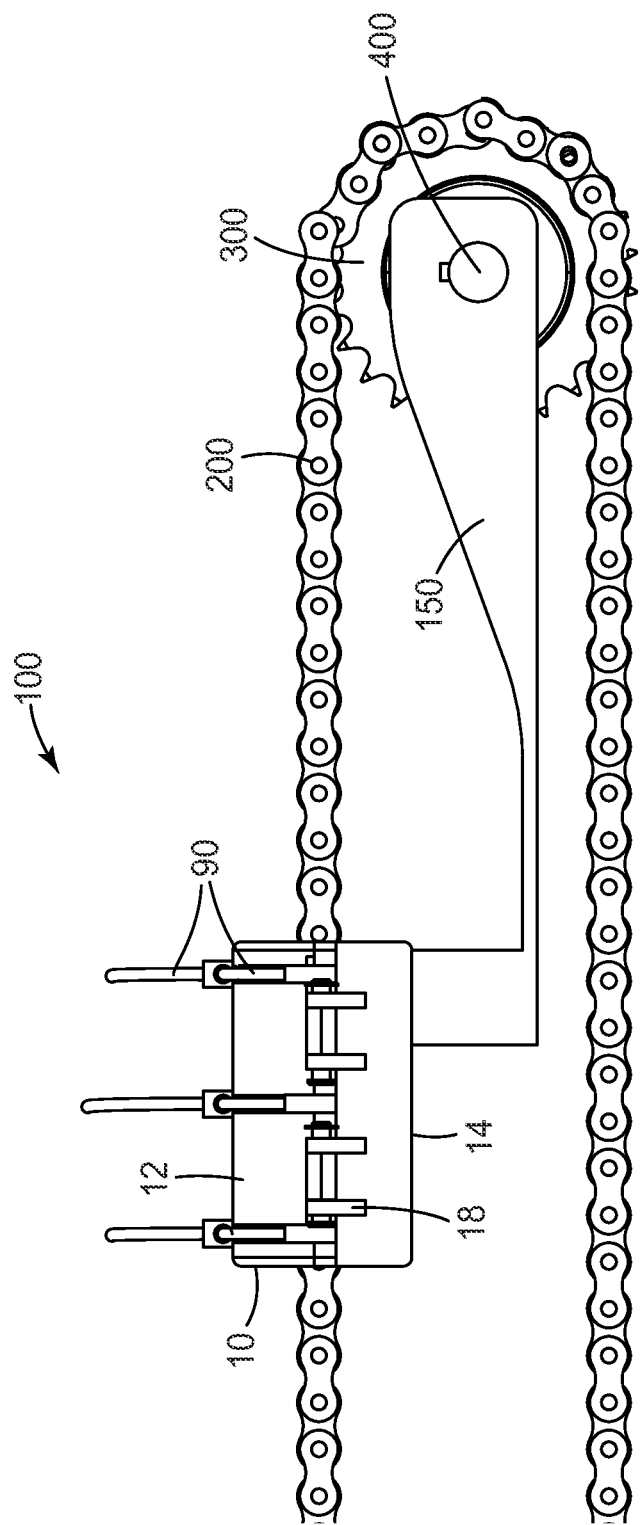
FIG. 1 shows a front view of a cleaning and lubricating device having a top casing and a bottom casing with a flexible mounting bracket in accordance with an exemplary embodiment of the present invention.

The present invention will be described in greater detail herein below with reference to the accompanying drawings.

With reference to FIGS. 1-5a, the present invention relates to a sequential cleaning and lubricating device (100) that comprises a compact and enclosed construction (10) with flexible mounts (150) for universal fit. The device (100) is also arranged with a contact cleaning mechanism and multi-direction oriented pneumatic jets, which can be adaptable to different surfaces and are capable of physical impact cleaning on regular and irregular profiles. The geometry of the device (100) ensures contact and non-contact cleaning followed by the lubrication processes in a sequential and repeatable manner as shown below in Table I.

TABLE I

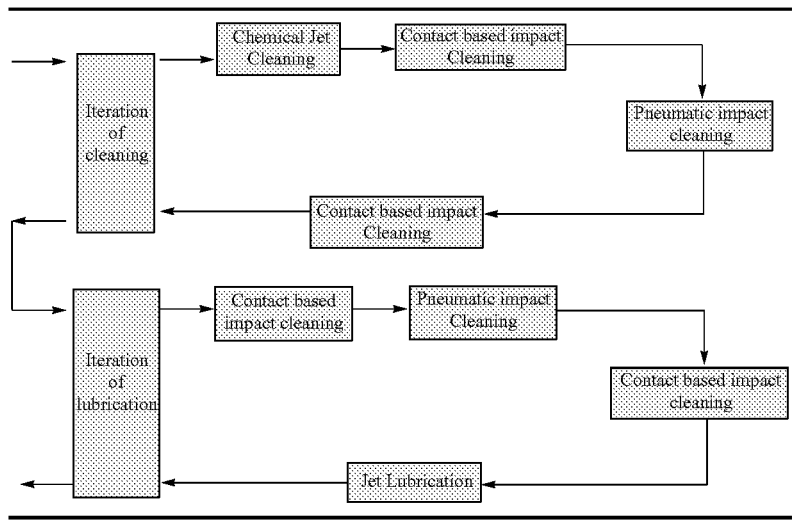

The universal mounting feature of the device (100) makes it compatible for use on all models of motorcycles or two wheelers. The device (100) consists of multiple radial oriented fine jet nozzles (70) and radial bristle brushes (60) which can do an effective cleaning and lubrication. This device (100) eliminates the need for removal of chain (200) from the two wheelers, and provides a dirt trap for collecting the residue of cleaning thereby improving productivity and ensuring a hygienic shop floor environment.

The key features and advantages of the sequential cleaning and lubricating device (100) of the present invention are that it is easy to snap on or snap off fit on the drive chain (200) of any motorcycles, flexible to mount and easily hinge with a sprocket shaft (400) to provide universal fitting for all motorcycles, ensures effective cleaning and lubrication using radially oriented fine jet nozzles (70) and radial bristle brushes (60), is provided with dirt trap regions (14a) fitting for easy removal of spent cleaner and dirt ensuring a safe and hygienic shop floor environment, and provides pneumatic cleaning process that is sandwiched between contact cleaning (Brushes (60)) for effective pre-cleaning and for recovery of excess cleaner and lubricant, thus reducing chances of drip post cleaning.

FIG. 1 shows a front view of a cleaning and lubricating device (100) having a top casing (12) and a bottom casing (14) with a flexible mounting bracket (150) in accordance with an exemplary embodiment of the present invention. It is shown that in a motorcycle, a drive chain (200) is wrapped around a sprocket wheel (300) in the known manner With reference to FIG. 1, the device (100) in accordance with the present invention is arranged on the upper strand of the chain (200) for sequential cleaning and lubricating the chain (200) of the motorcycle. Hereafter, the device (100) can be referred as sequential cleaning and lubricating device (100) for the purpose of explanation. The sequential cleaning and lubricating device (100) is fitted onto a structural part of the motorcycle, in particular a sprocket shaft (400) of the motorcycle to clean and lubricate the drive chain (200) of the motorcycle by transferring cleaning and lubricating material from multiple directions on to the surface of the motorcycle chain (200). The sequential cleaning and lubricating device (100) is composed of a housing (10) that is formed by a top casing (12) and a bottom casing (14), where the top and bottom casings (12, 14) of the housing (10) is held onto the sprocket shaft (400) of the motorcycle by a flexible mounting bracket (150). Preferably, the top casing (12) and the bottom casing (14) of the housing (10) and the flexible mounting bracket (150) are formed and shaped schematically and structurally as shown in FIGS. 1-5a. The flexible mounting bracket (150) ensures that the housing (10) of the sequential cleaning and lubricating device (100) remains at the intended location and position even during any movement of the drive chain (200).

Figure 2:
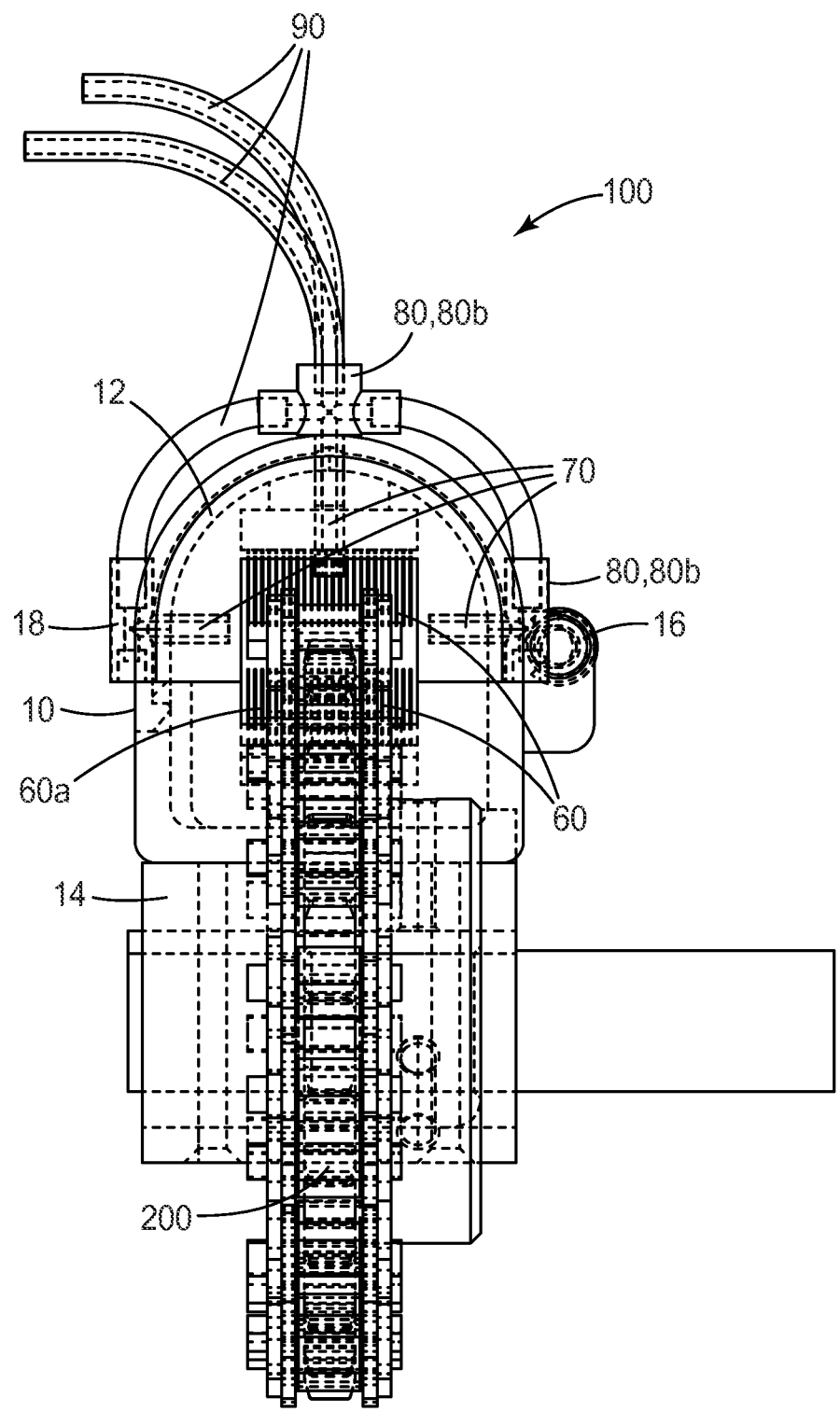
FIG. 2 shows a side view of the cleaning and lubricating device in accordance with an exemplary embodiment of the present invention.

Referring to FIG. 2, a side view of the cleaning and lubricating device (100) is illustrated in accordance with an exemplary embodiment of the present invention. The top casing (12) and the bottom casing (14) of the housing (10) are mutually connected by a snap-fit connection (18), whereas hinges (16) are attached at the opposite side of the snap-fit connection (18) in order to enable the top and bottom casings (12, 14) to be flipped apart each other for opening and closing of the housing (10). In particular, the top casing (12) is hinged to the bottom casing (14) by a hinge shaft at its one edge whereas the top casing (12) is snap fitted on to the bottom casing (14) at its other edge for opening and closing of the top casing (12) with respect to the bottom casing (14).

Figure 3:
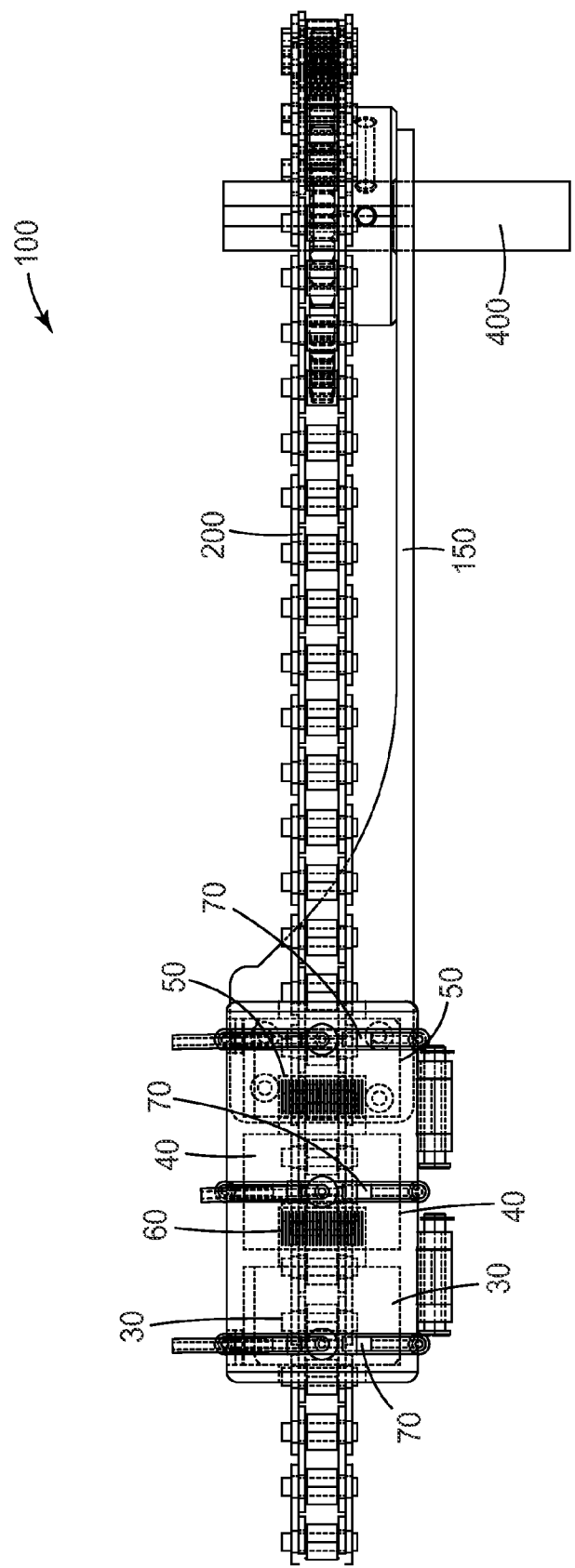
FIG. 3 shows a top view of the cleaning and lubricating device in accordance with an exemplary embodiment of the present invention.

Further, the top casing (12) and the bottom casing (14) of the housing (10) are mutually connected together in such a way that the housing (10) is partitioned into three compartments (30, 40, 50) in both the top and bottom casings (12, 14), where the three compartments (30, 40, 50) include solvent cleaning compartment acting as a first compartment (30), pneumatic/air and contact cleaning compartment acting as a second compartment (40), and lubricant compartment acting as a third compartment (50), as shown in FIG. 3, which illustrates a top view of the cleaning and lubricating device (100) in accordance with an exemplary embodiment of the present invention. The solvent cleaning compartment (30) is located at the front for supplying cleaner (Solvent) into the housing (10) to clean the drive chain (200), the pneumatic/air and contact cleaning compartment (40) is located at the center for air and contact cleaning of the drive chain (200), and the lubricant compartment (50) is located at the rear for supplying lubricant into the housing (10) to apply lubricant onto the drive chain (200).

Figure 4:
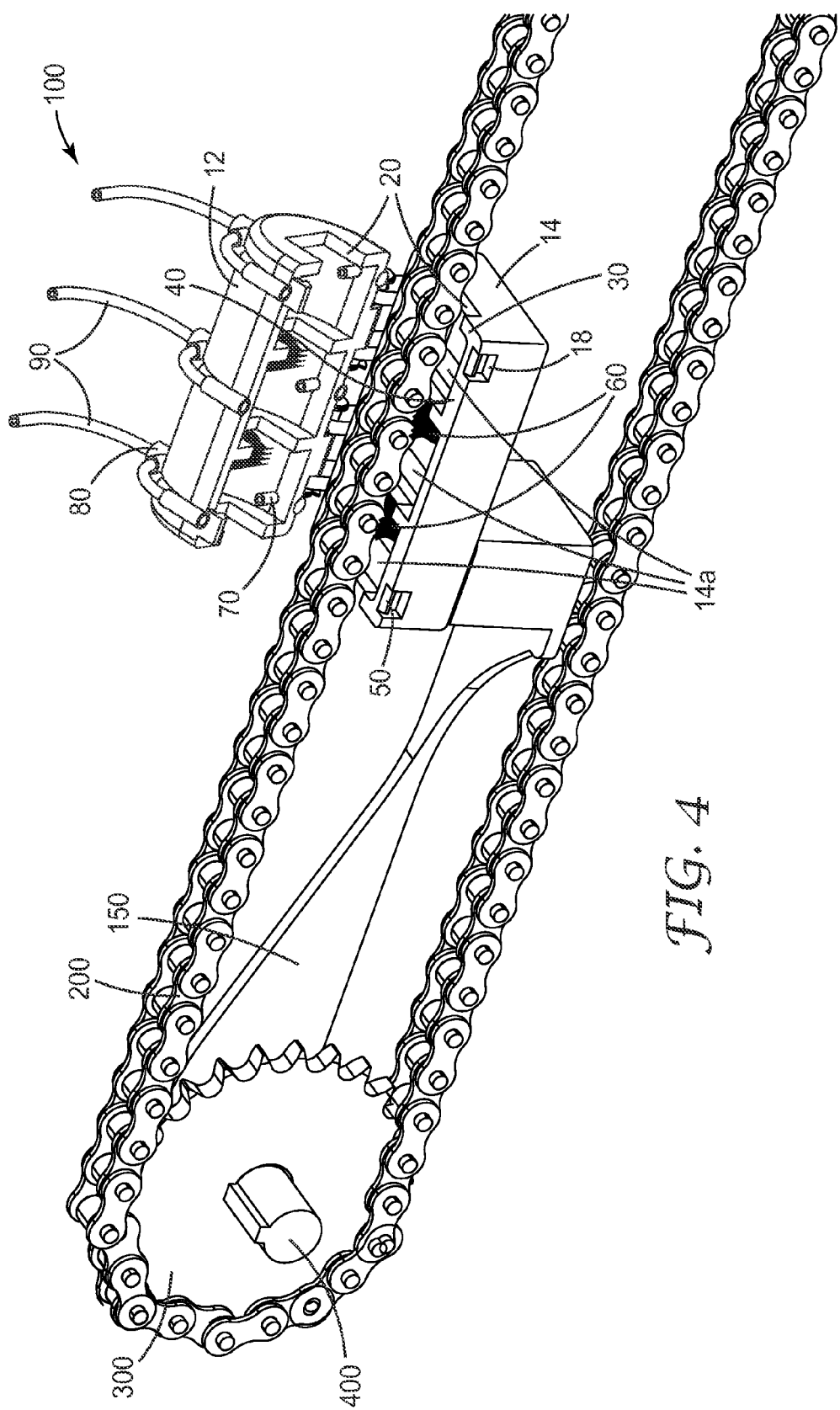
FIG. 4 shows a schematic view of the top casing in open condition of the cleaning and lubricating device in accordance with an exemplary embodiment of the present invention.

FIG. 4 shows a schematic view of the top casing (12) in open condition of the cleaning and lubricating device (100) in accordance with an exemplary embodiment of the present invention. The housing (10) is configured to enclose the drive chain (200) on all sides and define passageway openings (20) for allowing the drive chain (200) to pass through each compartment (30, 40, 50) of the housing (10). The passageway openings (20) are formed by the housing (10) in such a way that the passageway openings (20) can allow different dimensions of the drive chain (200) of the motorcycle. During the cleaning and lubricating process, the drive chain (200) is moved and rotated through the sprocket wheel (300), so that all portions of the drive chain (200) is passed through each compartment (30, 40, 50) of the housing (10) via the passageway openings (20) formed by the housing (10) when the top casing (12) and the bottom casing (14) are in closed condition.

At the entry of both the air and contact cleaning compartment (40) and the lubricant compartment (50), brushes (60) are arranged and attached in the interior of the housing (10), in particular the air and contact cleaning compartment (40) and the lubricant compartment (50) of the housing (10), so that the brushes (60) wipe off and clean the drive chain (200) from different directions. The brushes (60) are placed and attached in both the top and bottom casings (12, 14) of the housing (10) in such a way that flexible radial bristles (60a) of these brushes (60) are positioned towards and in contact with the surface of the drive chain (200) at different directions to wipe off the drive chain (200) from different directions, as shown in FIG. 4. The brushes (60) extend substantially transversally to the axial direction of the sequential cleaning and lubricating device (100). The radial bristle brushes (60) are placed between the second and third compartments (40, 50) for effective cleaning of the chain (200).

A plurality of inwardly facing nozzles schematically indicated with reference numerals (70) are arranged in the interior of each compartment (30, 40, 50) of the housing (10). There are at least three fine nozzles (70) equally placed radially inwards onto the drive chain (200) for all the three compartments (30, 40, 50) on the top casing (12) in order to supply and spray medium such as a cleaning agent or lubricating agent, onto the drive chain (200) housed inside the sequential cleaning and lubricating device (100), where the cleaning agent includes a solvent cleaning agent and a pneumatic cleaning agent. The nozzles (70) are attached and directed in upper side and two opposing sides of the interior of the top casing (12) of the housing (10) to supply the medium onto the drive chain (200) from different directions. The nozzles (70) are in connection with external connecting elements (80) on which external tubes (90) can be inserted in order to introduce the medium guided through the nozzles (70), into the housing (10) interior of the sequential cleaning and lubricating device (100).

Figure 5:
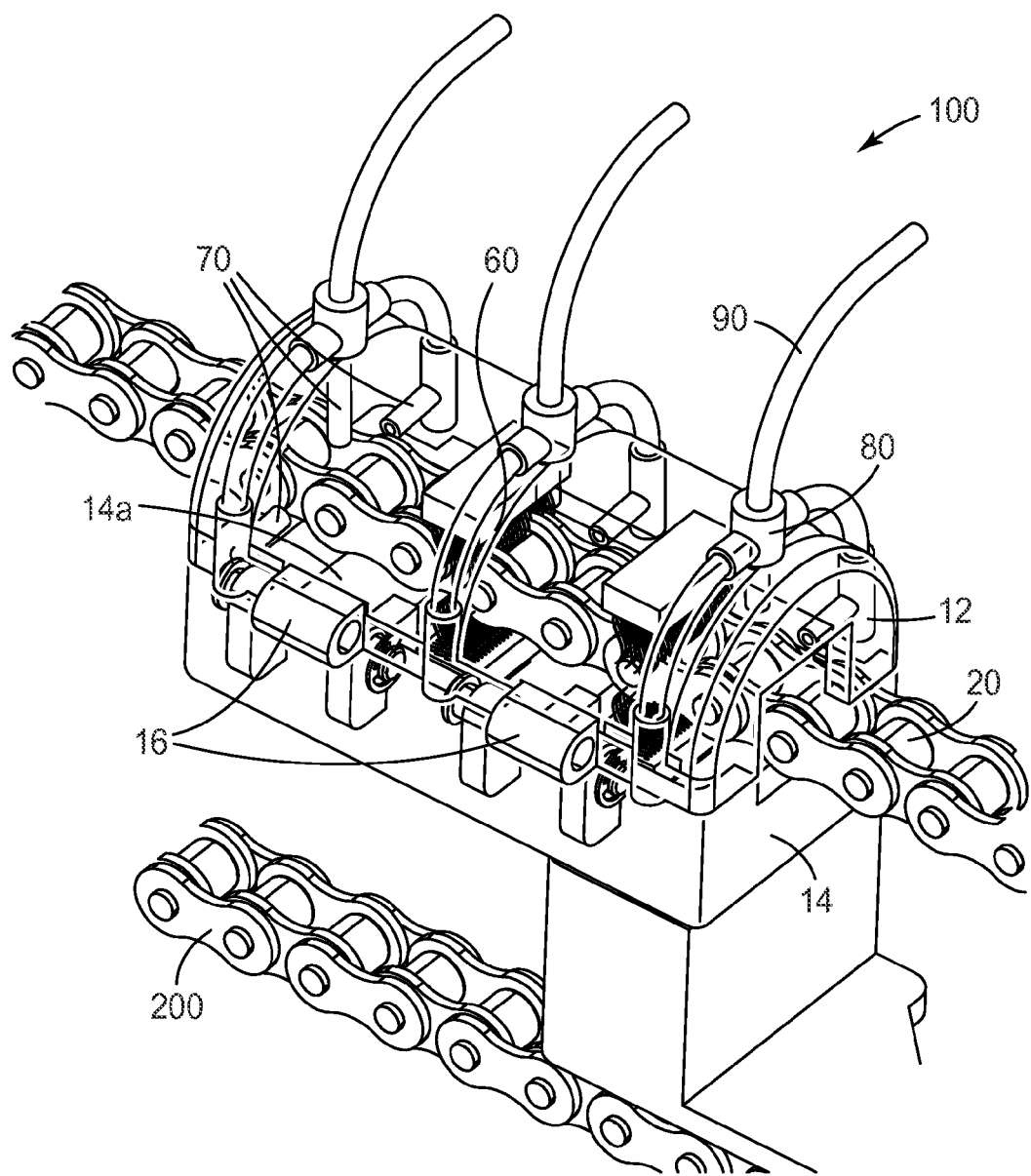
FIG. 5 shows a schematic transparent view of the top casing of the cleaning and lubricating device in closed condition in accordance with an exemplary embodiment of the present invention.

FIG. 5 shows a schematic transparent view of the top casing (12) of the cleaning and lubricating device (100) in closed condition in accordance with an exemplary embodiment of the present invention. Each nozzle (70) is extended and connected with the external connecting elements (80) which are placed outside of the top casing (12), so that the external tubes (90) are inserted onto the connecting elements (80) to supply the medium onto the drive chain (200) through the nozzles (70). The external connecting elements (80) are extended from the nozzles (70) and arranged on the outer surface of the top casing (12) of the housing (10) to supply the medium to the nozzles (70). Thus, the respective medium can be applied through the nozzles (70), on the surface of the sprocket chain (200) to be cleaned and lubricated, kept inside the housing (10) of the sequential cleaning and lubricating device (100). The external tubes (90) are in connection with a simple spray bottle (not shown) which can be used to supply the respective medium into the interior of the housing (10). However, the respective medium can also be supplied by way of a spray gun (not shown) with compressed air. The nozzles (70) are so arranged in the interior of the housing (10) to ensure that the tip of each nozzle (70) does not contact or in touch with the surface of the drive chain (200) passed through the housing (10).

The brushes (60) are arranged and placed in front of the nozzles (70) in the pneumatic/air and contact cleaning compartment (40) and the lubricant compartment (50) of the housing (10) in order to wipe off any excessive medium from the chain (200) before the chain (200) passes to the nozzles (70) in the pneumatic/air and contact cleaning compartment (40) and the lubricant compartment (50). In particular, the radial bristle brushes (60) are placed at the entry and exit of the pneumatic/air and contact cleaning compartment (40) for effective cleaning of the chain (200). The internal space of the bottom casing (14) of the housing (10) is arranged with at least one drain trap region (14a) that is separately and independently formed in each compartment (30, 40, 50) of the bottom casing (14) for collecting residue of the medium while cleaning and lubricating the drive chain (200) inside the housing (10) in order to drain the residue after cleaning.

Figure 5A:
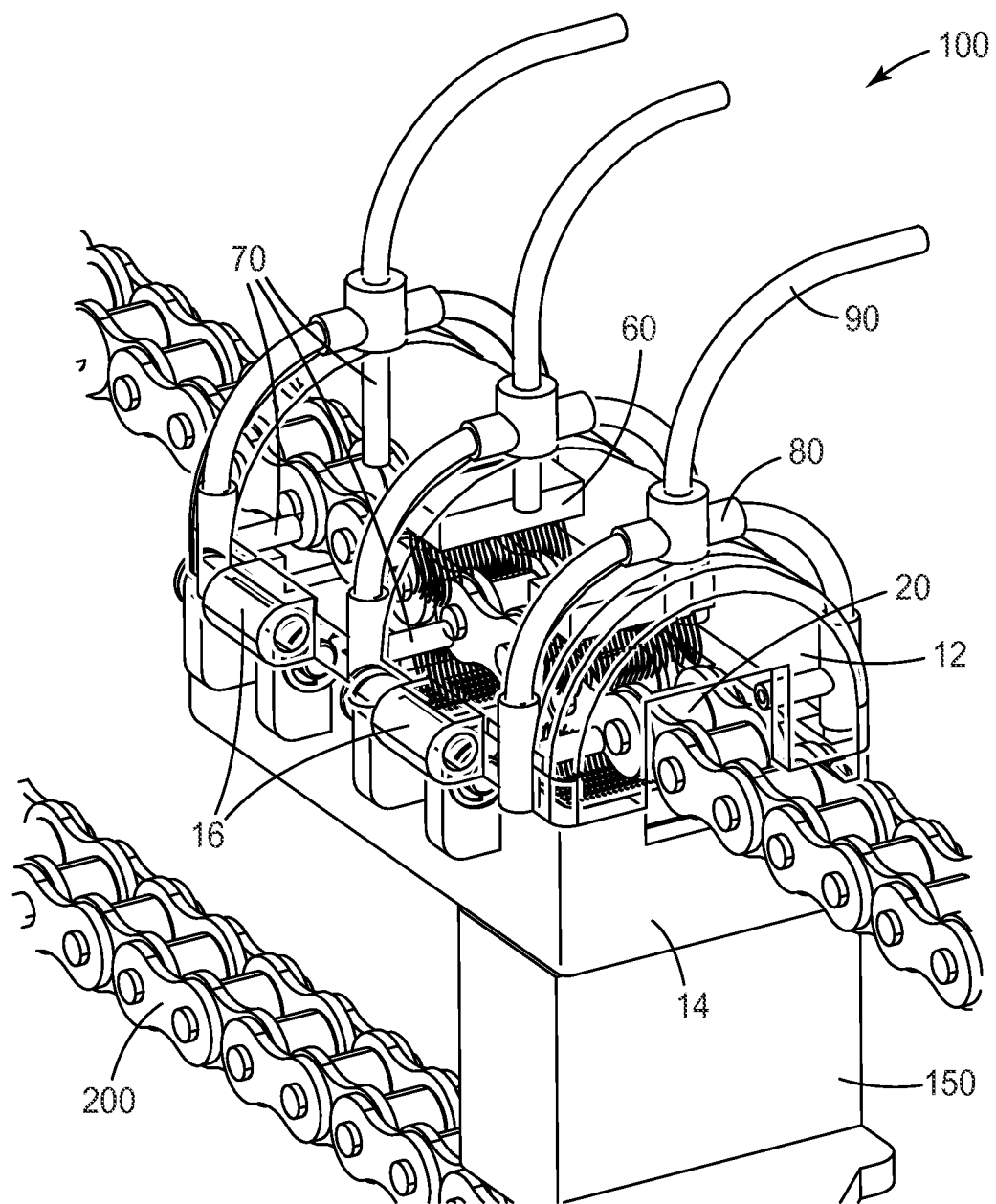
FIG. 5a shows a schematic transparent view of the top and bottom casings of the cleaning and lubricating device in closed condition in accordance with an exemplary embodiment of the present invention.

The nozzles (70) are connected to the Teflon tubes (90) by the external connecting elements (80) such as L-shaped connectors (80a) and T-shaped connectors (80b). The inlet for the solvent cleaning compartment (first compartment) (30) is connected to a chemical supplier unit (solvent cleaning aerosol) (not shown) by the T-shaped connector (80, 80b). Similarly, the inlet for the air and contact cleaning compartment (second compartment) (40) is connected to a compressed air supplier unit (compressed air) (not shown) by the T-shaped connector (80, 80b), and the inlet for the lubricant compartment (third compartment) (50) is connected to a lubricant supplier unit (chain lubricant aerosol) (not shown) by the T-shaped connector (80, 80b), as shown in FIG. 5a, which illustrates a schematic transparent view of the top and bottom casings (12, 14) of the cleaning and lubricating device (100) in closed condition in accordance with an exemplary embodiment of the present invention. The solvent/compressed air/lubricant is fed through the inlet for each compartment (30, 40, 50) which is connected to the nozzles (70) of each compartment (30, 40, 50). The chain movement allows the radial nozzles (70) to flush the grease, grime and dirt from the chain (200), and the residue of cleaning is collected in the drain trap regions (14a) of the bottom casing (14) of all the three compartments (30, 40, 50) of the housing (10).

The sequential cleaning and lubricating device (100) can be fitted onto the sprocket shaft (400) of the motorcycle, which needs its chain service. The process is basically done in two stages as shown in Table I.

First Stage:

The chain (200) is initially passed through a chemical cleaner by solvent chain cleaning aerosol in the first compartment (30) followed by contact cleaning (brushes (60)) in the second compartment (40), pneumatic (air) cleaning in the second compartment (40), and later again contact cleaning (brushes (60)) in the third compartment (50). This first stage process removes any over spray, drip and loose dirt clinging on to the surface of the chain (200), where the chemical cleaning step dissolves the grease and oily grime present in the chain (200).

Second Stage:

In this stage, the chain (200) is passed through the contact cleaner (brushes (60)) in the second compartment (40) and pneumatic (air) cleaning in the second compartment (40) followed by again contact cleaning (brushes (60)) in the third compartment (50) which later passed through the chain lubricant aerosol just after the contact cleaning in the third compartment (50).

The chain (200) needs to be moved though the sequential cleaning and lubricating device (100) by rotating the rear wheel during the two stages. Once the two stages have been completed, the device (100) can be removed from the motorcycle. Both the stages can have a pre-cleaning and post cleaning by the radial brushes (60) for effective dirt removal. After removing the device (100) from the motorcycle, then the mud/dust collected on the drain trap regions (14a) of the bottom casing (14) can be cleaned and again the device (100) can be reused for the next application.

The device (100) of the present invention allows cleaning and lubricating the chain (200) of the motorcycle in a reliable and effective manner with very little time and effort. Also, it is capable of rapidly and significantly transferring cleaning and lubricating material from multiple directions onto the profile of the surface to be cleaned and lubricated without coming in contact with any surface of the chain (200). As a result of the special arrangement of the device (100), the consumption of cleaning and lubricating agents are very low compared with alternative solutions. The device (100) in accordance with the invention is particularly light, easy to use and user-friendly. Further, it is flexible, convenient and adaptable to any motorcycles, and also removes any kind of stubborn dirt, oil and dust from the chain surface and provides dust free lubrication to the chain (200). In addition, it facilitates dust & dirt free station area and other parts of the vehicles.

Various modifications and alterations of this invention will be apparent to those skilled in the art without departing from the spirit and scope of this disclosure, and it should be understood that this disclosure is not limited to the illustrative embodiments set forth herein. For example, the reader should assume that features of one disclosed embodiment can also be applied to all other disclosed embodiments unless otherwise indicated. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

We claim:

1. A device for sequential cleaning and lubricating a drive chain, in particular of a motorcycle, comprising:
    a housing composed of a top casing and a bottom casing that are mutually connected together in such a way that the housing is partitioned into a plurality of compartments into which the drive chain is enclosed;
    a plurality of nozzles arranged within each compartment of the housing and placed radially inwards onto the drive chain to supply medium onto the drive chain;
    a plurality of brushes attached in the interior of at least one of the compartments of the housing in such a way that bristles of the brushes are positioned towards and in contact with the drive chain; and
    at least one drain trap region formed inside the bottom casing of each compartment of the housing to collect and drain the residue of medium during cleaning and lubricating the drive chain;
    wherein at least one of the compartments comprises one nozzle placed above the drive chain and one nozzle placed on each opposing side of the drive chain in the interior of the top casing of the housing to supply the medium from different directions.

2. The sequential cleaning and lubricating device as claimed in claim 1, wherein the housing defines passageway openings in each compartment for allowing the drive chain to pass through each compartment of the housing when the top casing and the bottom casing are in closed condition.

3. The sequential cleaning and lubricating device as claimed in claim 1, wherein the top casing is hinged and snap-fitted on to the bottom casing so that the top and bottom casings are flipped apart each other for opening and closing of the housing.

4. The sequential cleaning and lubricating device as claimed in claim 1, wherein the plurality of compartments is composed of at least one solvent cleaning compartment, at least one pneumatic and contact cleaning compartment and at least one lubricant compartment.

5. The sequential cleaning and lubricating device as claimed in claim 4, wherein the solvent cleaning compartment, the pneumatic and contact cleaning compartment and the lubricant compartment are respectively located at front, center and rear of the housing with respect to the direction of movement of the drive chain.

6. The sequential cleaning and lubricating device as claimed in claim 1, wherein the brushes are attached in both the top and bottom casings of the housing and positioned in front of the nozzles at the interior of the pneumatic and contact cleaning compartment and the lubricant compartment to wipe off the drive chain from different directions.

7. The sequential cleaning and lubricating device as claimed in claim 1, wherein each nozzle is extended and connected with external connecting elements on which external tubes are inserted in order to supply the medium onto the drive chain through the nozzles.

8. The sequential cleaning and lubricating device as claimed in claim 1, wherein the medium is a solvent cleaning agent, a pneumatic cleaning agent or a lubricating agent.

9. The sequential cleaning and lubricating device as claimed in claim 4, wherein the solvent cleaning agent, the pneumatic cleaning agent and the lubricating agent are respectively fed onto the drive chain through the respective nozzles of each of the solvent cleaning compartment, the pneumatic and contact cleaning compartment and the lubricant compartment.

10. The sequential cleaning and lubricating device as claimed in claim 1, wherein the top and bottom casings of the housing are held onto a sprocket shaft of the motorcycle by at least one mounting bracket.

11. The sequential cleaning and lubricating device as claimed in claim 10, wherein the device is fitted onto the sprocket shaft of the motorcycle to clean and lubricate the drive chain of the motorcycle by transferring the medium from multiple directions onto the surface of the drive chain.

* * * * *